United States Patent [19]

Takeuchi et al.

[11] 4,241,702
[45] Dec. 30, 1980

[54] NOISE-PROOF AND AIR-COOLED ENCLOSURE FOR AN ENGINE

[75] Inventors: Sadatoshi Takeuchi; Akio Iida, both of Kawasaki; Kimio Miyake, Yokohama; Mitsuhisa Sakae, Kawasaki, all of Japan

[73] Assignee: Kabushiki Kaisha Komatsu Seisakusho, Tokyo, Japan

[21] Appl. No.: 858,394

[22] Filed: Dec. 7, 1977

[30] Foreign Application Priority Data

Dec. 7, 1976 [JP] Japan .................. 51-163060
Dec. 7, 1976 [JP] Japan .................. 51-163061
Dec. 7, 1976 [JP] Japan .................. 51-163062
Dec. 7, 1976 [JP] Japan .................. 51-163064

[51] Int. Cl.³ .............................. F01P 1/02
[52] U.S. Cl. ..................... 123/41.7; 123/195 C; 123/198 E; 181/204
[58] Field of Search ............. 123/41.7, 41.49, 195 C, 123/198 E, 41.64; 180/54 A, 68 R; 165/51, 128; 55/431, 468; 181/204

[56] References Cited

U.S. PATENT DOCUMENTS

| 2,680,490 | 6/1954 | Dafoe | 123/41.05 |
|---|---|---|---|
| 3,237,614 | 3/1966 | Bentz | 123/41.49 |
| 3,630,003 | 12/1971 | Ashton | 180/68 R |
| 3,762,489 | 10/1973 | Proksch et al. | 181/204 |
| 3,866,580 | 2/1975 | Whitehurst et al. | 165/51 |
| 4,011,849 | 3/1977 | Latham | 123/198 E |
| 4,071,009 | 1/1978 | Kraina | 180/54 A |
| 4,081,050 | 3/1978 | Hennessey | 180/68 R |
| 4,114,714 | 9/1978 | Fachbach et al. | 181/204 |
| 4,122,353 | 10/1978 | Noguchi | 181/204 |
| 4,133,547 | 1/1979 | Fox | 181/204 |
| 4,164,262 | 8/1979 | Skatsche et al. | 123/195 C |

*Primary Examiner*—Charles J. Myhre
*Assistant Examiner*—Willis Wolfe
*Attorney, Agent, or Firm*—Armstrong, Nikaido, Marmelstein & Kubovcik

[57] ABSTRACT

A noise-proof and air-cooled enclosure system for an engine comprising a radiator compartment, a generally enclosed engine compartment separated from said radiator compartment by a partition wall, said radiator compartment being arranged sideways with respect to said engine compartment, and an ejector utilizing the flow of gases from an engine exhaust pipe for creating a relatively low pressure within an air outlet from said engine compartment to draw ambient cooling air through said radiator compartment into said engine compartment around said engine and out of said air outlet.

6 Claims, 12 Drawing Figures

NOISE-PROOF AND AIR-COOLED ENCLOSURE FOR AN ENGINE

BACKGROUND OF THE INVENTION

This invention relates to a sound-proofed vehicle having a radiator compartment mounted on the sides of an engine compartment thereby separating the engine compartment from the radiator compartment.

In general, engines of large vehicles such as those for construction purposes generate the noise of high levels. Therefore, it is contemplated to accommodate the engine in an engine compartment of enclosed structure so as to reduce the noise level. However, the engine is provided with a fan for cooling the radiator as an auxiliary device so that it is necessary to provide an inlet port for drawing the cooling air therein and an outlet port for discharging the air therethrough. Therefore, even if other component parts are constructed in the form of an enclosed structure, the noise is principally generated when the air passes through the inlet and outlet ports, and therefore satisfactory sound-proofing effect can hardly be obtained.

SUMMARY OF THE INVENTION

It is therefore an object of the present invention to provide an improved noise-proof and air-cooled enclosure for an engine.

Another object of the present invention is to provide a vehicle having a noise-proof and air-cooled enclosure system wherein a radiator compartment is separated by a partition wall from an engine compartment and is arranged sideways therewith.

In accordance with an aspect of the present invention, there is provided a vehicle having a noise-proof and air-cooled enclosure system comprising a vehicle frame, an engine supportably mounted on said frame having an exhaust pipe thereon, a radiator mounted on said frame, said radiator being arranged sideways with respect to said engine and associated therewith, a radiator compartment having an inlet and an outlet for cooling air, a relatively closed engine compartment having inlet and outlet means for cooling air, a partition wall for separating said engine compartment from said radiator compartment, said partition wall having an opening for communicating said both compartments, the opening being adapted to serve as the inlet means to said engine compartment, and ejector means utilizing the flow of gases from said engine exhaust pipe for creating a relatively low pressure within said air outlet means from said engine compartment to draw ambient cooling air through said radiator compartment into said engine compartment around said engine and out of said air outlet means.

According to the structure of the present invention, since the engine and the turbocharger thereof is substantially enclosed by wall means, the level of noise discharged therefrom can be remarkably reduced while maintaining an excellent cooling condition within the engine compartment.

The above and other objects, features and advantages of the present invention will be readily apparent from the following description taken in conjunction with the accompanying drawings.

DETAILED DESCRIPTION OF THE INVENTION

Figure 1:
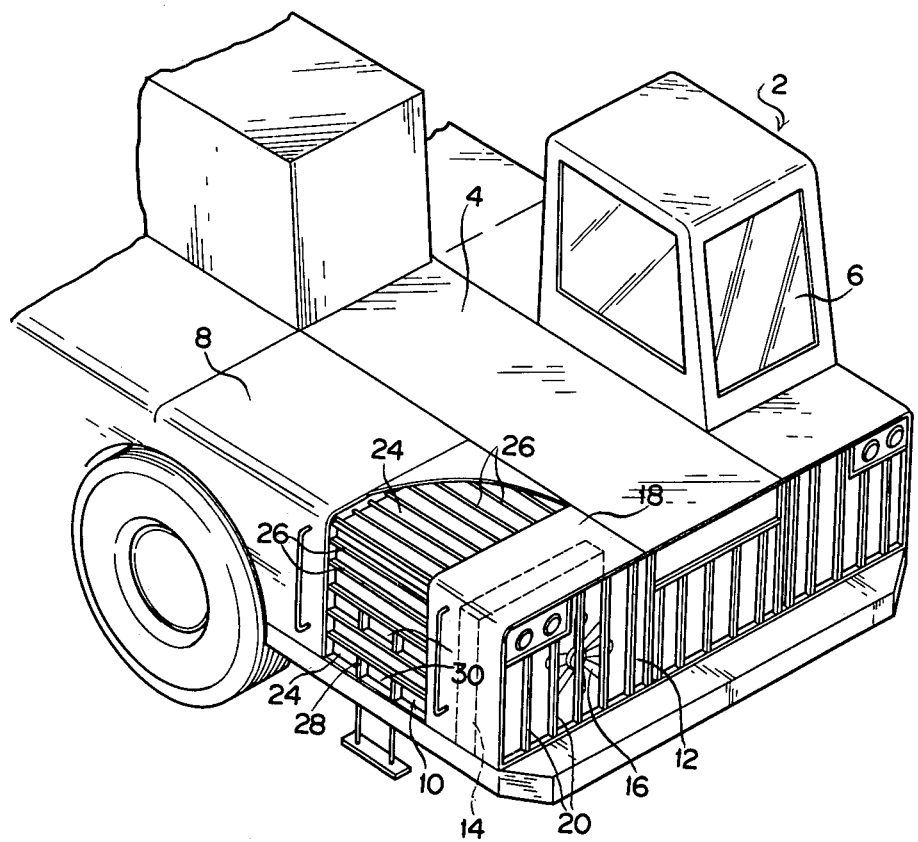
FIG. 1 is a perspective view of the front portion of a vehicle according to the present invention.
Figure 2:
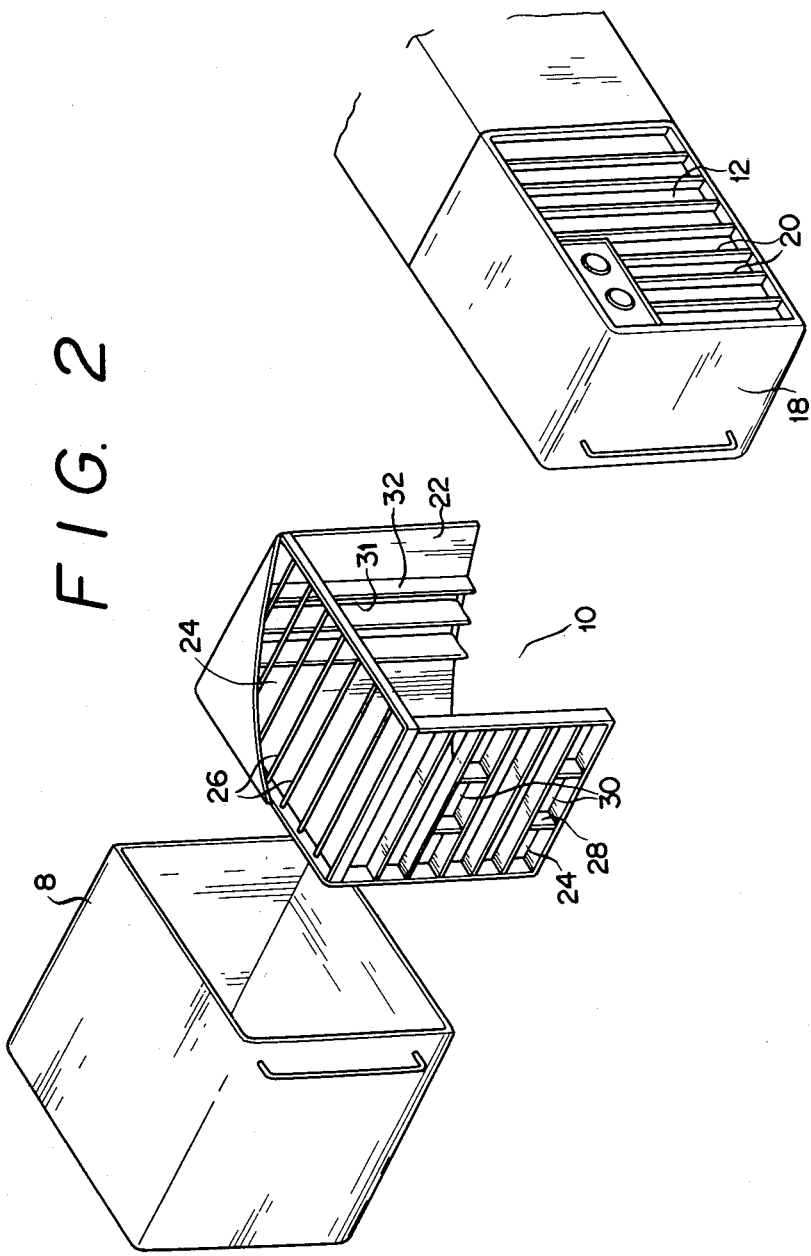
FIG. 2 is a diagramatic exploded view of a wall structure defining a radiator compartment.

The present invention will now be described in detail below by way of embodiments with reference to the accompanying drawings. In the drawings, reference numeral 2 denotes a body of a large vehicle such as construction vehicles etc. having an enclosed engine compartment 4 mounted on the central front part thereof. Accommodated in the engine compartment 4 is a prime mover or engine 5. Reference numeral 6 denotes a driver's cab mounted on the left side of the above-mentioned engine compartment 4. Reference numeral 8 indicates a fuel tank mounted on the right side of the engine compartment 4, and in front of the fuel tank 8 there is formed a radiator compartment 10. The radiator compartment 10 has air inlet port 12 formed in the front part thereof, and installed in the rear part of the air inlet port 12 is a radiator 14 for introducing the cooling water sent from the engine therein and dissipating the heat of the cooling water. Mounted in front of the radiator means 14 is a cooling fan 16 adapted to be driven or rotated by the engine 5 through a power transmission means such as a fan belt etc. A radiator guard 18 is mounted in the periphery of the cooling fan 16 and the radiator means 14 so as to surround them in a frame. The radiator guard 18 has a grille 20 fitted to the front face thereof, and has also an arcshaped guide plate 22 fitted to the rear end part thereof. The guide plate 22 serves to guide the cooling air having passed the radiator means 14 on the side of the radiator compartment 10, and has its trailing edge connected to the fuel tank 8. The radiator compartment 10 has an outlet port 24 formed on the side and upper part thereof. The outlet port 24 has a plurality of flow regulating plates 26 spaced apart in parallel with the longitudinal direction of the vehicle. Out of the flow regulating plates 26, those mounted in the outlet port 24 formed on the upper part of the radiator chamber 10 are inclined so as to discharge the cooling air obliquely and sideways, whilst the flow regulating plates 26 mounted in the outlet port 24 formed on the side of the radiator 10 are installed horizontally, and a part of which is divided by longitudinal plates 28 which serves as steps 30 to be used when maintenance is carried out on the vehicle.

Reference numeral 31 denotes an air inlet port which is formed in the guide plate 22 so as to draw a part of the cooling air in the enclosed engine compartment 4 and which has sound-proofing or absorbing blades 32 mounted in the longitudinal direction thereof.

Figure 5:
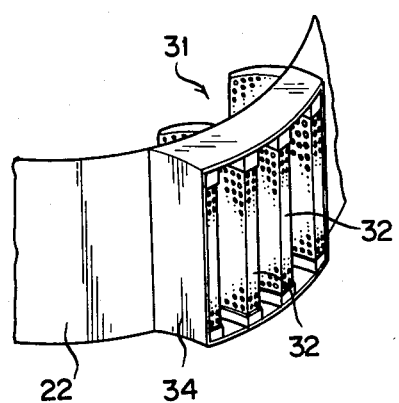
FIG. 5 is a perspective view of the air inlet means to the engine compartment.
Figure 6:
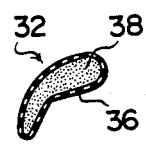
FIG. 6 is a cross-sectional view of a sound-absorbing blade mounted in the air inlet means in FIG. 5.
Figure 7:
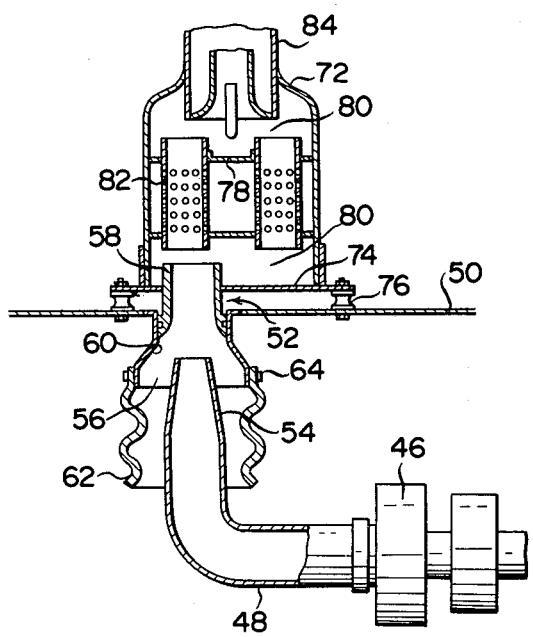
FIG. 7 is a longitudinal cross-sectional view of ejector means according to the present invention.
Figure 8:
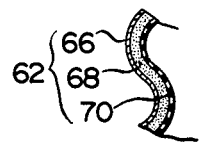
FIG. 8 is an enlarged cross-sectional view of a sound-absorbing cylinder showing the structure thereof.

As best shown in FIG. 5, the sound-absorbing blades 32 are attached at the upper and lower ends thereof to a frame means 34 fixedly secured to the guide plate 22. The sound-absorbing blades 32 have each an outer shell 36 consisting of a porous plate and having steamlined sectional shape so as not disturb the cooling air flow, and a sound-absorbing material is filled in the outer shell 36.

Figure 3:
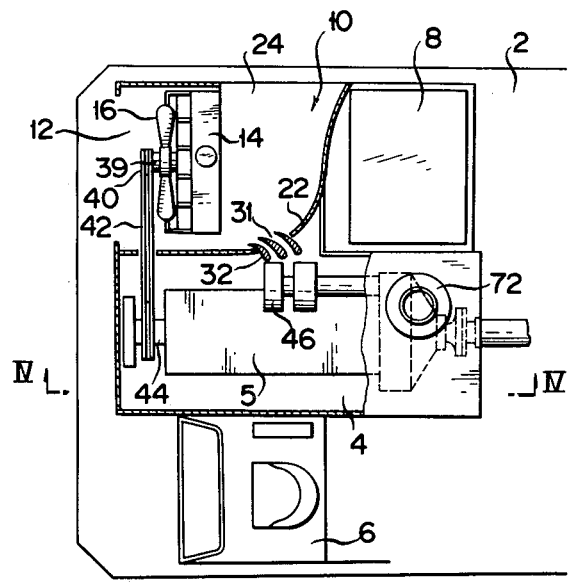
FIG. 3 is a schematic plan view partially in cross-section showing the enclosure system of the present invention.
Figure 4:
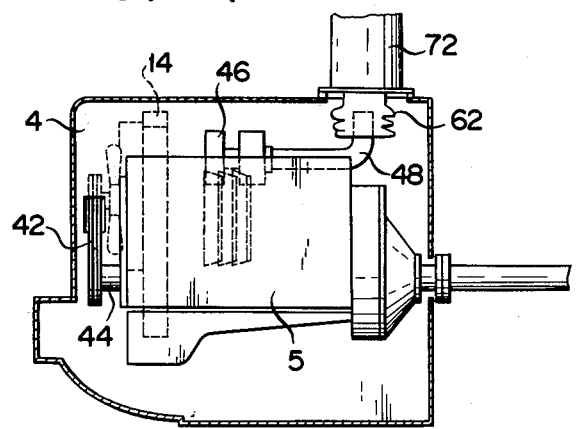
FIG. 4 is a cross-sectional view taken along the line IV—IV in FIG. 3.

Referring to FIG. 3, the cooling fan 16 mounted in the radiator compartment 10 has a rotary shaft 39 having a pulley 40 which is fixedly secured thereto and which is connected through a V-belt 42 to a crankshaft 44 of the engine 5 and is arranged to be driven by the engine. Arrangement is made such that cooling water is circulated in the engine 5 and the radiator 14 by way of cooling water tubes not shown.

Figure 9:
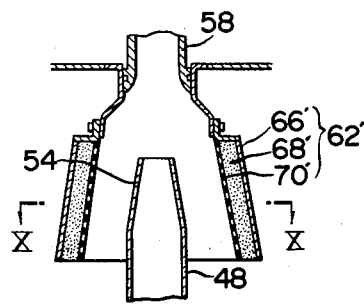
FIG. 9 is an alternative embodiment of the ejector means.
Figure 10:
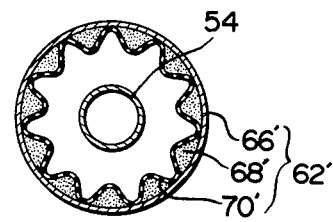
FIG. 10 is a cross-sectional view taken along the line X—X in FIG. 9.

The cooling air guided by the aforementioned sound-absorbing blades 32 is arranged to impinge collectively on a turbocharger 46 mounted within the engine compartment 4. The turbocharger 46 has an exhaust pipe 48 connected thereto and which extends upwards and has a leading end adapted to be inserted in an ejector 52 installed in the upper face plate 50 of the engine compartment 4. The leading end of the above-mentioned exhaust pipe 48 is formed in the shape of a nozzle having a taper or gradually reduced diameter. A stack 58 is mounted in the periphery of the nozzle part 54 so as to leave a clearance or space 56 therebetween. The lower part of the stack 58 is formed in the shape of a skirt opening within the engine compartment 4, and has an opened marginal portion 60 to which is fixedly secured by means of a fastener means 64 a corrugated or wave-shaped sound-absorbing cylinder 62. The sound-absorbing cylinder 62 is formed by a sound-absorbing material 68 fitted to a wave-shaped cylindrical steel plate 66, the sound-absorbing material 68 having a perforated plate 70 mounted thereon so as to protect it. The arrangement is made such that the noise caused by wind when the air is drawn from the engine compartment into the stack 58 and also the noise generated by the engine 5 per se can be absorbed. FIGS. 9 and 10 show another embodiment of the above-mentioned sound-absorbing cylinder 62 which comprises a sound-absorbing material 68' fitted to the inside of a skirt-shaped steel plate 66', said sound-absorbing material 68' having a corrugated, perforated plate 70' secured thereto so that a sound-absorbing effect higher than that of the aforementioned sound-absorbing cylinder 62 can be obtained.

Further, the upper part of the above-mentioned stack 58 is gradually reduced in diameter and its leading end opens in a muffler 72 mounted on the upper part of the engine compartment 4. The muffler 72 has a mounting plate 74 fitted in the bottom part thereof and which is fixedly secured through vibration-proofing rubber members 76 to the upper face plate 50 of the engine compartment 4. The inside of the muffler 72 is divided by partition walls 78 into a plurality of expansion chambers 80. The expansion chambers 80 are permitted to communicate with one another by communicating tubes 82 each having a plurality of small holes formed in the shell thereof. The arrangement is made such that the exhaust gas having passed through the expansion chambers 80 can be discharged in the atmosphere outside through an exhaust pipe 84. Since the ejector means 52 is constructed as mentioned above, when the exhaust gas from the turbocharger 46 is discharged from the nozzle 54 into the stack 58, the pressure inside the sound-absorbing cylinder 62 is reduced by the ejector effect. Therefore, the cooling air in the engine compartment 4 is positively drawn by the ejector means 52 so that the engine cooling effect can be increased.

Figure 11:
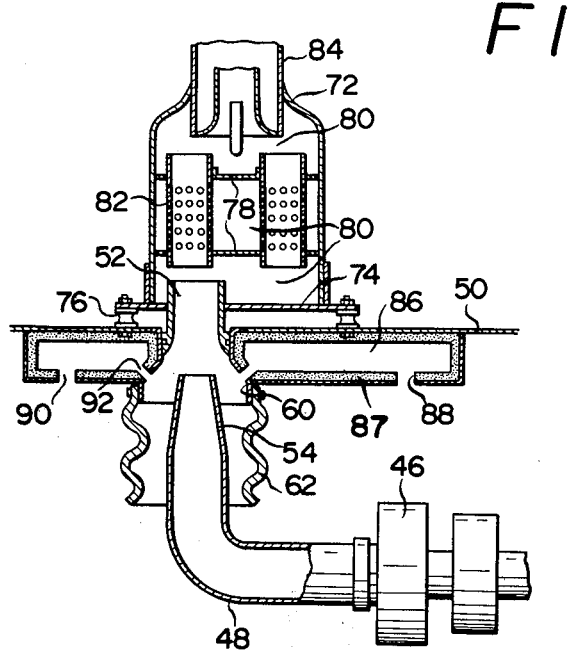
FIG. 11 is similar to FIG. 7 but showing the ejector means provided with a duct.
Figure 12:
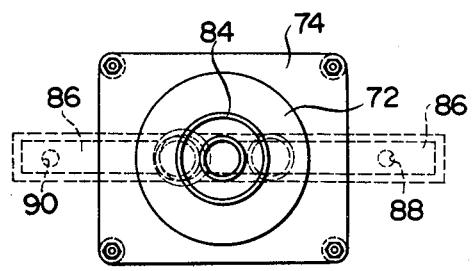
FIG. 12 is a plan view of FIG. 9.

FIGS. 11 and 12 show another embodiment of the ejector means according to the present invention having a duct 86 fixedly secured transversely to the upper face plate 50 of the engine compartment 4. Located in the approximately central part of the duct 86 is an ejector means 52, and formed in the bottom parts of both ends of the duct 86 are inlet or suction ports 88 and 90 adapted to draw the cooling air therein. The suction port 88 is located above the turbocharger 46. This is because the cooling air tends to be heated most in the vicinity of the turbocharger 46, and the heated air is drawn positively in through the suction port 88 so that the cooling air can be drawn in the ejector means 52 through a hole 92 formed in the connection part of the duct 86 and the ejector means 52 and then discharged to the outside.

Since sound-absorbing material 87 is affixed to the inner surface of the duct 86, noise generated by the engine 5 can be absorbed efficiently by the sound-absorbing material 87 while passing through the duct 86.

While this invention is susceptible of embodiment in many different forms, there is shown in the drawings and has been described herein in detail a specific embodiment of the invention, with the understanding that the present disclosure is to be considered as an exemplification of the principles of the invention and is not intended to limit the invention to the embodiment illustrated.

What is claimed is:

1. A vehicle having a noise-proof and air-cooled enclosure system comprising a vehicle frame;
   an engine supportably mounted on said frame having an exhaust pipe thereon;
   a radiator for cooling said engine, mounted on said frame, said radiator being arranged sideways with respect to said engine;
   a radiator compartment having an inlet and an outlet for cooling air, said radiator compartment enclosing said radiator;
   a closed engine compartment positioned adjacent said radiator compartment and having inlet means and outlet means for cooling air said engine compartment enclosing said engine;
   a partition wall for separating said engine compartment from said radiator compartment, said partition wall having an opening means for communicating between said compartments said opening means including sound absorbing means wherein said sound absorbing means includes a plurality of sound absorbing blades positioned in said opening means, and wherein said opening means is the inlet means for said engine compartment; and
   ejector means in said engine compartment said ejector means utilizing the flow of gases from said engine exhaust pipe for creating a relatively low pressure within said air outlet means from said engine compartment to draw ambient cooling air through said radiator compartment into said engine compartment around said engine and out of said air outlet means.

2. The vehicle as defined in claim 1 wherein said air outlet means includes a duct fixedly secured to the upper wall of said engine compartment, said duct having holes formed in the lower wall thereof, one of the holes being positioned above a turbocharger of said engine.

3. The vehicle as defined in claim 1 wherein the inlet to said radiator compartment is formed in the front wall thereof and the outlet from said radiator compartment is formed in one of the side walls and the upper wall thereof.

4. The vehicle as defined in claim 1 wherein said outlet means of said engine compartment includes sound absorbing means.

5. The vehicle as defined in claim 1 wherein said ejector means includes a generally tubular stack extending from said engine compartment in aligned relationship with said air outlet means and said engine exhaust pipe extends partially concentrically into said tubular stack.

6. The vehicle as defined in claim 5 wherein said exhaust pipe has a nozzle on the extremity thereof in order to increase the velocity of the exhaust gases emanating therefrom for more effective operation of said ejector means.

* * * * *